United States Patent [19]

Bloomfield et al.

[11] Patent Number: 5,694,964
[45] Date of Patent: Dec. 9, 1997

[54] METHOD AND ARTICLE FOR INSERTING VALVE SPOOL INTO SECONDARY BORE

[75] Inventors: Curtis Bloomfield, Loveland; Nelson David Bove, Cincinnati, both of Ohio; Brian Murphy, Ann Arbor; James Erie Parker, Lincoln, both of Mich.

[73] Assignee: Ford Global Technologies, Inc., Dearborn, Mich.

[21] Appl. No.: 717,332

[22] Filed: Sep. 20, 1996

[51] Int. Cl.[6] ............................ F16K 43/00; B23P 15/00
[52] U.S. Cl. .................. 137/15; 29/447; 29/890.124; 137/315; 137/625.69
[58] Field of Search ............................ 29/464, 434, 447, 29/743, 777, 890.124, DIG. 44; 137/15, 315, 625.69

[56] References Cited

U.S. PATENT DOCUMENTS

| | | | |
|---|---|---|---|
| 3,285,565 | 11/1966 | Barnier et al. | 251/328 |
| 4,316,600 | 2/1982 | Parise et al. | 251/245 |
| 4,487,222 | 12/1984 | Crawford | 137/516.29 |
| 4,676,482 | 6/1987 | Reece et al. | 251/365 |
| 5,131,694 | 7/1992 | Portis | 285/351 |
| 5,145,005 | 9/1992 | Dollison | 166/334 |
| 5,267,723 | 12/1993 | Shea et al. | 251/359 |
| 5,285,805 | 2/1994 | Proper | 137/1 |
| 5,289,634 | 3/1994 | Makino et al. | 29/890.124 |
| 5,456,007 | 10/1995 | Bove et al. | 29/890.124 |
| 5,472,326 | 12/1995 | Tarpley | 417/454 |
| 5,531,013 | 7/1996 | Nakamura | 29/890.124 |

Primary Examiner—George L. Walton
Attorney, Agent, or Firm—James J. Dottavio

[57] ABSTRACT

A method and valve assembly for inserting a spool into a secondary bore of a valve body. A slave tool is inserted into a primary bore axially adjacent a secondary bore of the valve body. The slave tool includes a slave bore axially aligned with the secondary bore. The spool is inserted through the slave bore into the secondary bore. A chamfer is provided on a first end of the secondary bore or spool adjacent the slave tool.

15 Claims, 2 Drawing Sheets

METHOD AND ARTICLE FOR INSERTING VALVE SPOOL INTO SECONDARY BORE

FIELD OF THE INVENTION

The present invention relates to a valve assembly to facilitate assembly of a valve spool into a bore of a valve body and a method of a inserting a valve spool into a bore of a valve body.

BACKGROUND OF THE INVENTION

The assembly of a valve spool into a bore in a valve body, in particular spool valves into stepped valve bores within transmission valve bodies, is done mainly by hand. A slave tool is often used to guide the spool through the primary portion of the stepped bore into the secondary portion of the stepped bore. When the end of the spool comes into contact with the valve body at the opening of the stepped bore at a secondary portion thereof, the edge contact between the end of the spool and the edge of the secondary portion of the stepped bore may result in the end of the spool tearing a portion of the valve body at the opening of the secondary portion of the stepped bore, thereby forming a chip. The chip may become lodged between the spool and the secondary portion of the bore, thereby causing the spool to stick and cause the valve to malfunction.

It is desirable to provide some clearance between the inside diameter of the slave tool and the outside diameter of the spool to accommodate any variation in concentricity or axial alignment between the primary and secondary portions of the stepped bore, as well as any diametrical variation in the bore or spool, and to provide clearance to facilitate assembly. This slight clearance and any variation in the size and alignment of the primary and secondary portions of the stepped bore, as well as clearance and variation between the bore and tool may permit misalignment between the spool and the opening of the secondary portion of the stepped bore, further enabling the spool to create a chip upon insertion into the opening of the secondary portion of the stepped bore. Additionally, clearance is desirable between the outside diameter of the slave tool and the primary portion of the stepped bore to accommodate installation and removal of the slave tool, or to accommodate the variation described above.

It is therefore desirable to provide a valve which permits easier insertion of a spool into the secondary portion of a stepped bore of the valve without edge contact between the end of the spool and the secondary portion of the bore.

SUMMARY OF THE INVENTION

In its embodiments the present invention contemplates a valve assembly and a method of assembling a spool into the secondary portion of a stepped bore of a valve body without creating a chip.

The valve assembly includes a stepped bore having a secondary portion with a chamfer at a first end thereof. A spool is inserted through the chamfer into the secondary portion. The spool includes a reduced end adjacent the chamfer to prevent contact between the spool and the valve body at the chamfer during operation of the valve.

The method includes inserting a slave tool into a primary portion of a stepped bore axially adjacent a secondary portion of the stepped bore in a valve body. The slave tool includes a slave bore axially aligned with the secondary portion of the stepped bore. The spool is inserted through the slave bore into the secondary portion of the bore. A chamfer is provided on a first end of the secondary portion of the bore adjacent the slave tool.

Accordingly, it is an object of the present invention to provide a method and valve assembly which provides for easier installation of the spool into the valve and which prevents edge contact between the spool and valve during such installation.

BRIEF DESCRIPTION OF THE DRAWINGS

Other advantages and features of the valve of the present invention will be apparent to those skilled in the arts upon reading the following description with reference to the accompanying drawings, in which.

DETAILED DESCRIPTION OF THE PREFERRED EMBODIMENTS

In the attached Figures, similar parts and features shown in different Figures are designated with like numbers having a prime.

Figures 1, 2:
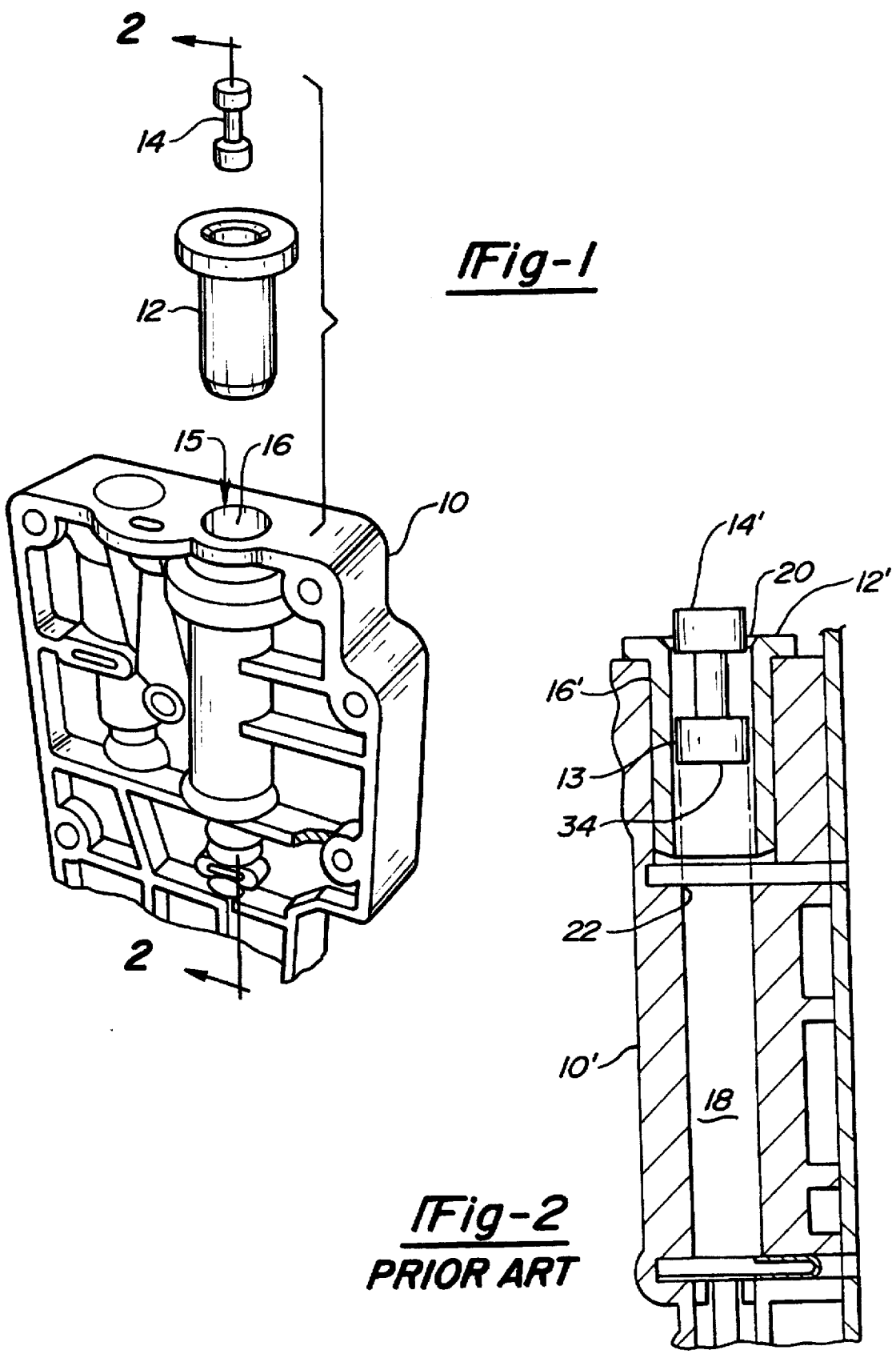
FIG. 1 is a partially exploded perspective view of a transmission valve body.
FIG. 2 is a partial sectional view taken along line 2—2 in FIG. 1 showing a slave tool and a spool being inserted through the slave tool into a secondary portion of a stepped bore of a prior art valve body.

FIG. 1 shows a transmission valve body 10 having a slave tool 12 and spool 14 being inserted into a primary portion 16 of a stepped bore 15.

As shown in FIG. 2, the slave tool 12' is inserted into the primary portion 16' of the stepped bore in a transmission valve body 10. A spool 14' is inserted through a slave bore 20 provided in the slave tool 12' into a secondary portion 18 of the stepped bore of the valve body 10.

The secondary portion 18 of the stepped bore is in axial alignment with the primary portion 16'. The slave tool 12' has an outside diameter 13 which is positioned by the primary portion 16' of the stepped bore. The slave bore 20 is in axial alignment with the secondary portion 18 of the stepped bore through the alignment of the outside diameter of the slave tool 12' with the inside diameter of the primary portion 16' of the bore. The primary portion 16' is used as a pilot to align the slave tool 12'. Thus, when the spool 14' is inserted through the slave bore 20, the spool 14' is positioned relative to the secondary portion 18 of the stepped bore during installation of the spool 14'.

As described in the Background section above, the first end 34 of the spool 14' may contact the prior art valve body 10 at the edge 22 of the opening of the secondary portion 18 of the stepped bore, thereby creating an edge contact and forming a chip.

As described in U.S. Pat. No. 4,456,007 ('007), assigned to the assignee of the present invention, which is incorporated herein for its relevant teachings, the diameter of the slave bore 20 of slave tool 12' is preferably slightly greater than the diameter of secondary portion 18 of the valve bore. The diameter of the spool valve 14' is in the range of 0.0007–0.0011 inch diameter smaller than the diameter of the secondary portion 18 of the bore, with an average of approximately 0.0009 inch difference. This means that the gap between the outer surface of spool valve 14' and the inner surface of secondary portion 18 of the bore, if they are aligned perfectly concentrically, is 0.00045 inch. This tolerance makes it difficult to insert the spool 14' into the secondary portion of the stepped bore 18 without contacting the edge 22 of the secondary portion 18 and creating a chip which may cause the spool to jam in the bore. Alternatively, the clearance described above is provided between the slave tool and the primary bore. The same issues with spool alignment exist in such a situation in a similar magnitude.

Figure 3:
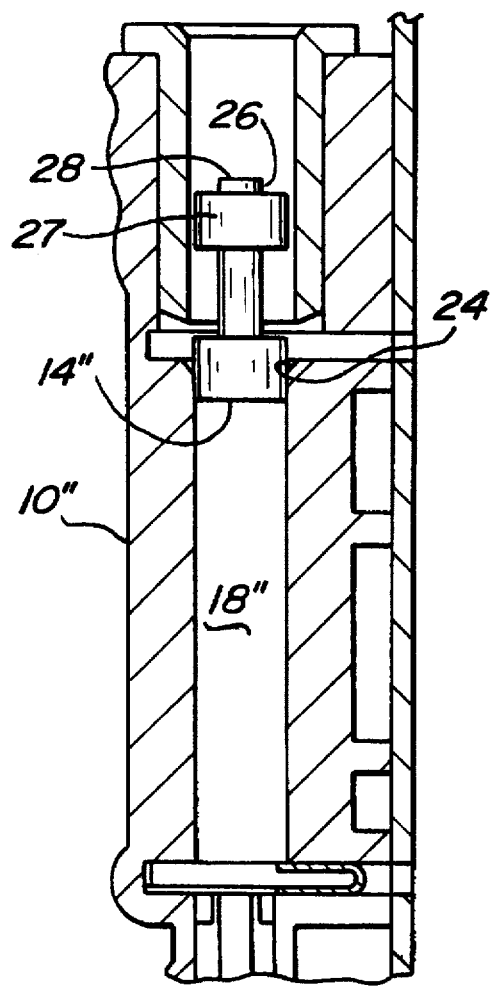
FIG. 3 is a partial sectional view taken of a slave tool and a spool being inserted through the slave tool into a secondary portion of a stepped bore of a valve body according to the present invention.

As shown in FIG. 3, a valve body 10" according to the present invention includes a chamfer 24, or broken corner, at the opening of the secondary portion 18" of the stepped bore, thereby eliminating the square corner which existed with prior art designs. By chamfering this bore opening, the spool 14" is able to cross the opening and align with the secondary portion 18" of the bore without encountering edge contact, and a chip is therefore not formed.

In a preferred embodiment, the chamfer 24 extends radially outwardly from the secondary portion 18" of the bore for a dimension greater than the anticipated variation, clearance, and misalignment of the spool and bores as described above. Therefore, the chamfer permits radial movement of the spool to allow the spool to radially align itself with the secondary portion 18" of the stepped bore without contacting an edge of the secondary portion 18" of the bore. Therefore no chip is formed by the spool 14" breaking the corner, because the corner has been previously removed as described above.

As described in the prior art, a slave tool 12" having a slave bore 20" is preferably used to align the spool 14" during installation through the primary portion 16" of the stepped bore into the secondary portion 18" of the stepped bore. In an alternative embodiment, the primary and secondary portions 16", 18" have the substantially the same diameter and a slave tool 12" is not used. Alternatively, other positioning means, such as robotic positioners, may be used to align the spool 14" to the secondary bore 18", and in such instances, no slave tool 12" is required.

Figure 4:
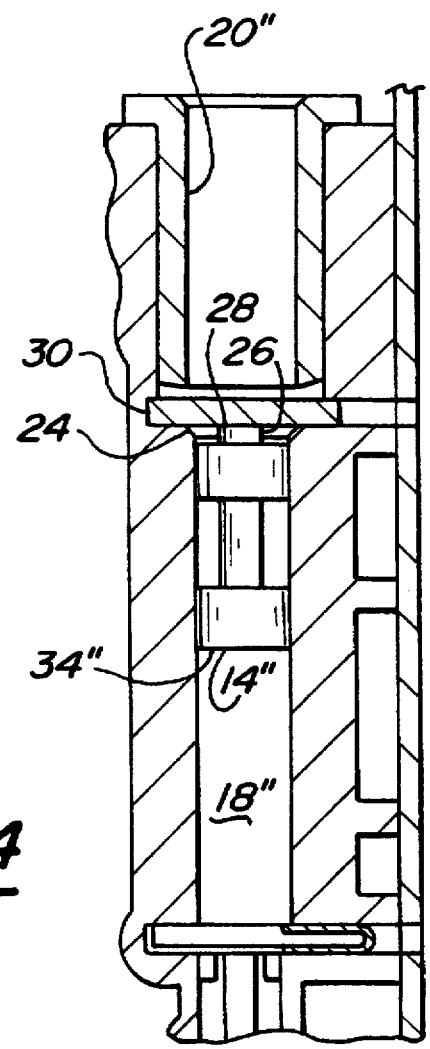
FIG. 4 is a partial sectional view taken of the slave tool and spool in a valve body according to the present invention.

A preferred embodiment further includes a relief in the land 27 of the spool, embodied as a reduced section 26 at the top 28" of the spool 14". As shown in FIG. 4, the reduced section 26 enables the non-reduced portion, or land 27, at the top 28" of the spool 14" to remain below the chamfer 24 as the spool 14" moves axially during operation of the valve. Therefore the land portion 27 of the spool 14" remains in contact with the seal portion of the bore 18" and the land 27 does not wear across the edge of the chamfer 24 when the spool 14" moves axially. The reduced section 28 therefore comprises a portion of the spool 14" which has a reduced diameter in order to avoid contact with the bore 18" of the valve. The axial dimension of the reduced section 26 of the spool 14" from the end 28 of the spool to the land 27 is greater than the axial length of the chamfer 24 from the first end of the secondary portion 18", as shown in FIG. 4, to prevent the land 27 from contacting the secondary portion 18" of the bore at the chamfer 24.

As further shown in FIG. 4, the valve further includes a stop plate 30, as is known in the art, to limit the travel of the spool 14" within the secondary portion 18" of the stepped bore. The plate 30 may constitute a solid plate as shown, or a spring retainer as shown in the '007 patent. The plate 30 positions the reduced portion 26 of the spool 14" adjacent the chamfer 26" as described above. As is further known in the art, a biasing spring (not shown) may be provided between the plate 30 and the spool 14", or at the opposite end of the spool to bias the spool to a desired position. The plate 30 and/or spring act as a stop means to prevent further axial movement of the spool 14" to keep the land 27 of the spool 14" from contacting the chamfered 24 portion of the secondary portion 18" of the valve.

In an alternative embodiment (not shown) the spool includes a spool chamfer at the end of the spool remote from the end with the reduced section described above. This spool chamfer is used in combination with the chamfer of the secondary portion of the bore, or in place thereof for ease of alignment of the spool with the secondary portion and thereby avoiding the edge contact described above.

Furthermore, the present invention is particularly well suited for use with the automated assembly taught in the '007 patent. By adding the chamfer taught in the present invention, the spool is more easily installed using the method and automated equipment taught in the '007 patent. Thus, a vacuum mechanism as taught in the '007 patent is provided having a gripper for manipulating the spool. The mechanism aligns the spool with either the slave bore of the slave tool or with the secondary portion of the stepped bore as described above. A vacuum is created within the secondary portion of the bore, thereby drawing the spool into the secondary portion. When the gripper releases the spool, the vacuum draws the spool through the primary portion of the bore, past the chamfer and into the secondary portion. The chamfer ensures the spool does not encounter an edge contact with the opening of the secondary portion of the bore.

While certain embodiments of the present invention have been described in detail, those familiar with the art to which this invention relates will recognize various alternative designs and embodiments for practicing the invention as defined by the following claims.

We claim:

1. A valve assembly for inserting a spool into a valve body, the assembly comprising:

a valve body having a stepped bore formed therein, said bore having primary and secondary portions and a chamfer formed at an end of the secondary portion adjacent the primary portion; and a spool having a land formed at a first end of said spool and a relieved portion formed at the first end of said spool adjacent said land, said spool being inserted into said secondary portion past said chamfer to prevent edge contact between said spool and said valve body at said secondary portion, and said relieved portion being positioned adjacent said chamfer so said land does not contact said bore at said chamfer after said spool is inserted into said secondary portion.

2. A valve assembly according to claim 1 further comprising a stop provided between said primary and secondary portions to prevent said land on said spool from contacting said bore at said chamfer after said spool is inserted.

3. A valve assembly according to claim 2 wherein said valve is assembled using a slave tool to align said spool with said secondary portion, said slave tool including a slave bore in axial registration with said secondary portion of said bore and an outside diameter in registration with said primary portion of said bore, said spool being inserted through said slave bore to align said spool with said secondary portion to prevent edge contact between said spool and said valve body at said secondary portion.

4. A valve assembly apparatus for inserting a spool into a valve body, the apparatus comprising:

a valve body having a stepped bore formed therein, said bore having primary and secondary portions and a chamfer formed at an end of the secondary portion adjacent the primary portion;

a spool having a land formed at a first end thereof and a relieved portion formed at said first end;

a slave tool having an outside diameter received in said primary portion of said bore and an axial internal slave bore in axial registration with said secondary portion of said bore, wherein said spool is inserted through said slave bore to align said spool with said chamfer to prevent edge contact between said spool and said valve body at said secondary portion when said spool is inserted.

5. The apparatus of claim 4 further comprising a stop provided between said primary and secondary portions to prevent said land on said spool from contacting said bore at said chamfer after said spool is inserted.

6. A method of installing a spool into a valve assembly comprising the steps of:

providing a stepped bore having primary and secondary portions in a valve body;

providing a chamfer at an end of the secondary portion adjacent the primary portion;

providing a land at an end of a spool;

providing a relieved portion at the end of said spool adjacent said land;

aligning said spool with said secondary portion of said bore;

inserting said spool past said chamfer into said secondary portion to prevent edge contact between said spool and said valve body at said secondary portion; and positioning said relieved portion adjacent said chamfer so said land does not contact said bore at said chamfer after said spool is inserted in said secondary portion.

7. A method according to claim 6 further comprising the step of providing a stop between said primary and secondary portions to prevent said land on said spool from contacting said bore at said chamfer after said spool is inserted.

8. A method according to claim 7 further comprising the steps of:

providing an outside diameter on a slave tool in registration with said primary portion of said bore;

providing a slave bore in said slave tool in axial registration with said secondary portion of said bore;

inserting said slave tool in said primary portion prior to inserting said spool; and inserting said spool into said slave bore to align said spool with said secondary portion to prevent edge contact between said spool and said valve body at said secondary portion.

9. A method according to claim 7 further comprising the steps of:

aligning the spool immediately outside of the bore oriented substantially concentric with the secondary portion;

beginning vacuum suction in the secondary bore in the direction of insertion of the spool; and receiving the spool into the bore.

10. A method according to claim 9 wherein the step of receiving comprises pulling the part into the bore with the suction and a gravity force.

11. A method according to claim 10 further comprising the step of twisting the part back-and-forth until the part is received into the bore.

12. A method according to claim 11 further comprising the step of moving the part in a spiral motion about a central longitudinal axis of the part of progressively increasing diameter until the part is received into the bore.

13. A valve assembly for inserting a spool into a valve body, the assembly comprising:

a valve body having a stepped bore formed therein, said bore having primary and secondary portions and a chamfer formed at an end of the secondary portion adjacent the primary portion;

a spool having a land formed at a first end of said spool, said spool being inserted into said secondary portion past said chamfer to prevent edge contact between said spool and said valve body at said secondary portion; and a stop for preventing said land from contacting said bore at said chamfer after said spool is inserted into said secondary portion.

14. A valve assembly according to claim 13 wherein said stop comprises a stop plate provided between said primary and secondary portions.

15. A valve assembly according to claim 14 wherein said stop further comprises a spring provided between said stop plate and said spool.

* * * * *